United States Patent [19]

Pier

[11] Patent Number: 4,955,108

[45] Date of Patent: Sep. 11, 1990

[54] PROTECTED HINGE ASSEMBLY FOR MECHANICAL ACCELEROMETER

[75] Inventor: Nicholas F. Pier, Thousand Oaks, Calif.

[73] Assignee: Litton Systems, Inc., Alameda, Calif.

[21] Appl. No.: 380,135

[22] Filed: Jul. 14, 1989

[51] Int. Cl.$^5$ .................... E05D 1/02; B23K 31/02
[52] U.S. Cl. .................... 16/226; 228/213; 219/91.2; 29/434; 73/517 B; 16/374
[58] Field of Search ............ 228/212, 213, 179; 219/91.2, 91.23, 94, 86.24; 29/428, 434; 73/514, 517 R, 517 B; 16/226, 374; 403/403, 272

[56] References Cited

U.S. PATENT DOCUMENTS

| | | | |
|---|---|---|---|
| 1,389,728 | 9/1921 | Akimoff | 16/226 |
| 1,575,030 | 3/1926 | Behn | 29/11 |
| 3,078,721 | 2/1963 | Sawyer | 73/497 |
| 3,130,589 | 4/1964 | Sawyer | 73/497 |
| 3,391,579 | 7/1968 | Kumpfer | 73/517 R |
| 3,618,401 | 11/1971 | Lacey | 73/517 B |
| 4,599,896 | 7/1986 | Stewart | 73/382 R |
| 4,613,249 | 9/1986 | Schwartz | 403/403 |
| 4,637,255 | 1/1987 | Graham | 73/517 R |
| 4,679,434 | 7/1987 | Stewart | 73/517 B |
| 4,744,248 | 5/1988 | Stewart | 73/505 |
| 4,744,249 | 5/1988 | Stewart | 73/505 |
| 4,750,362 | 6/1988 | Pier | 73/497 |
| 4,788,864 | 12/1988 | Pier | 73/517 B |
| 4,841,774 | 6/1989 | Hall | 73/517 |

Primary Examiner—Kenneth J. Ramsey
Attorney, Agent, or Firm—Roy L. Brown

[57] ABSTRACT

The invention is a hinge assembly made of two parts, specifically for an accelerometer. The first part is adapted to be attached, either directly or through a bracket, to an inertial acceleration sensor. The second part is adapted to be rigidly attached to an apparatus whose acceleration is to be measured. The two parts are connected by a flexible hinge.

The invention resides in the placement of the hinge and in the attaching means for the second part of the hinge frame as well as in the method for fabricating the novel attaching means.

The hinge is not attached to the center of the opposing edges of the first and second parts of the hinge frame. It is attached to one end of those opposing sides at a first region of the second part of the hinge frame. The hinge line is generally parallel to those opposing sides.

The second part of the hinge frame is clamped only in a second region away from the hinge. It is rigidly clamped between two tilted stops which are usually welded to the second part along a weld line that is generally perpendicular to the hinge line. The tilted stops extend into the first region of the second part with a predetermined small gap, depending upon the tilt, in that region to allow slight deflection of the first region of the hinge frame through the resilience of that region, but with the stops snubbing extensive excursions of the region. Thus, the motion of the region under extreme acceleration or shock absorbs enough energy to protect the hinge. The first region is thick enough and rigid enough that it does not deflect significantly when received accelerations are within the design range of the accelerometer.

The method of the invention uses struts to tip a stop relative to the hinge frame or the hinge frame relative to a stop and to hold the members in their relative tilted positions while they are fastened into place. The strut may be part of a spacer.

106 Claims, 6 Drawing Sheets

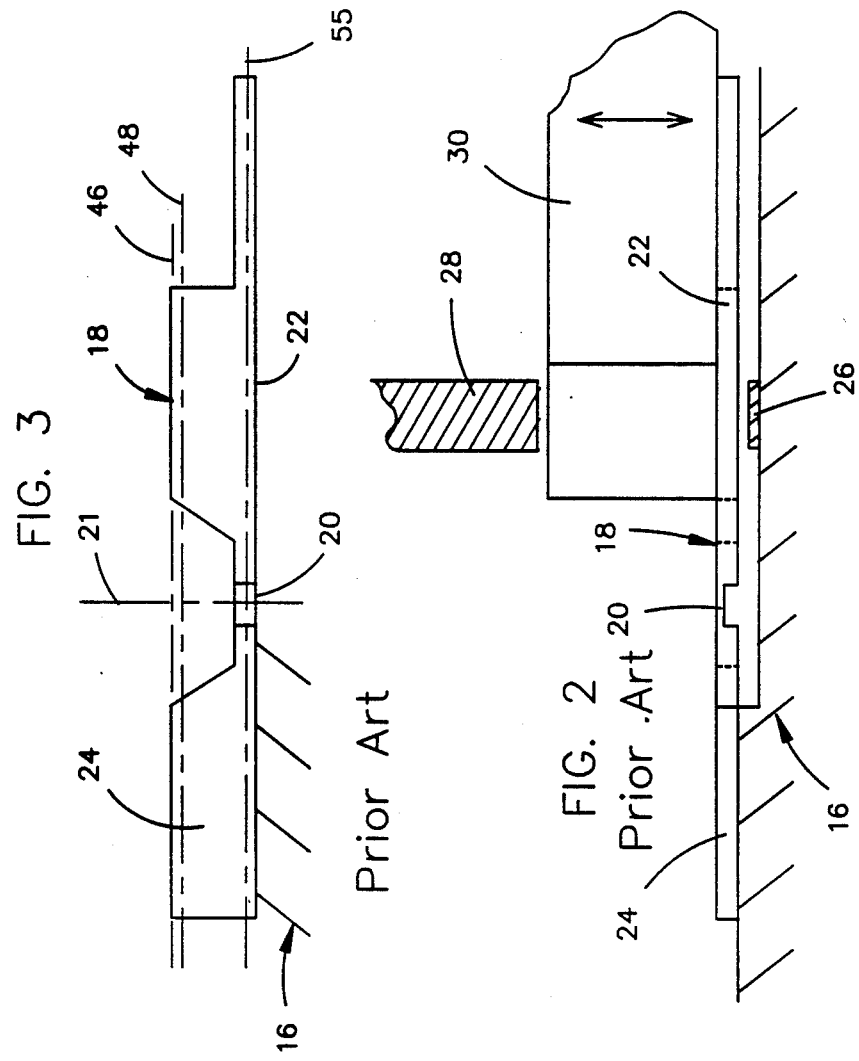

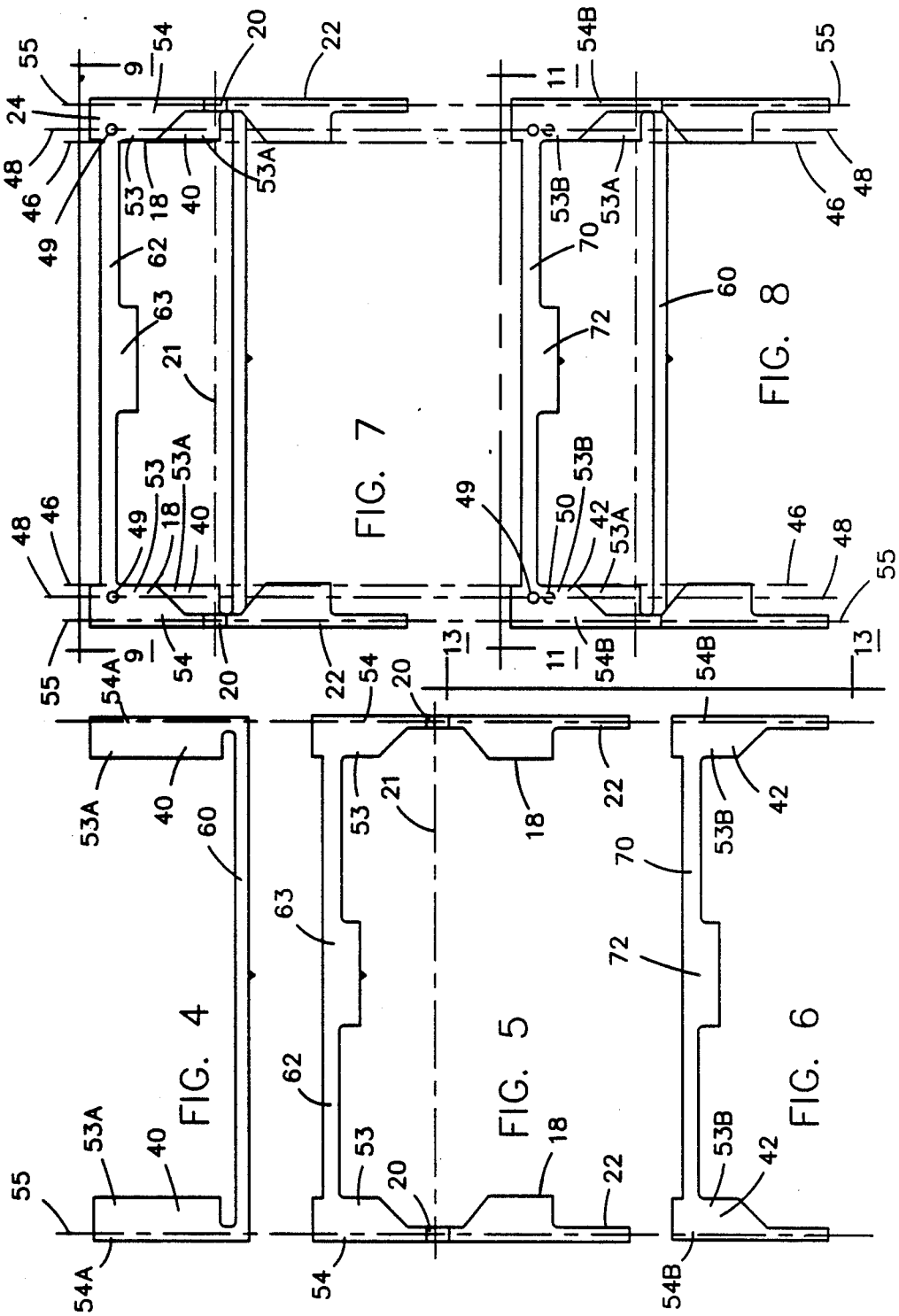

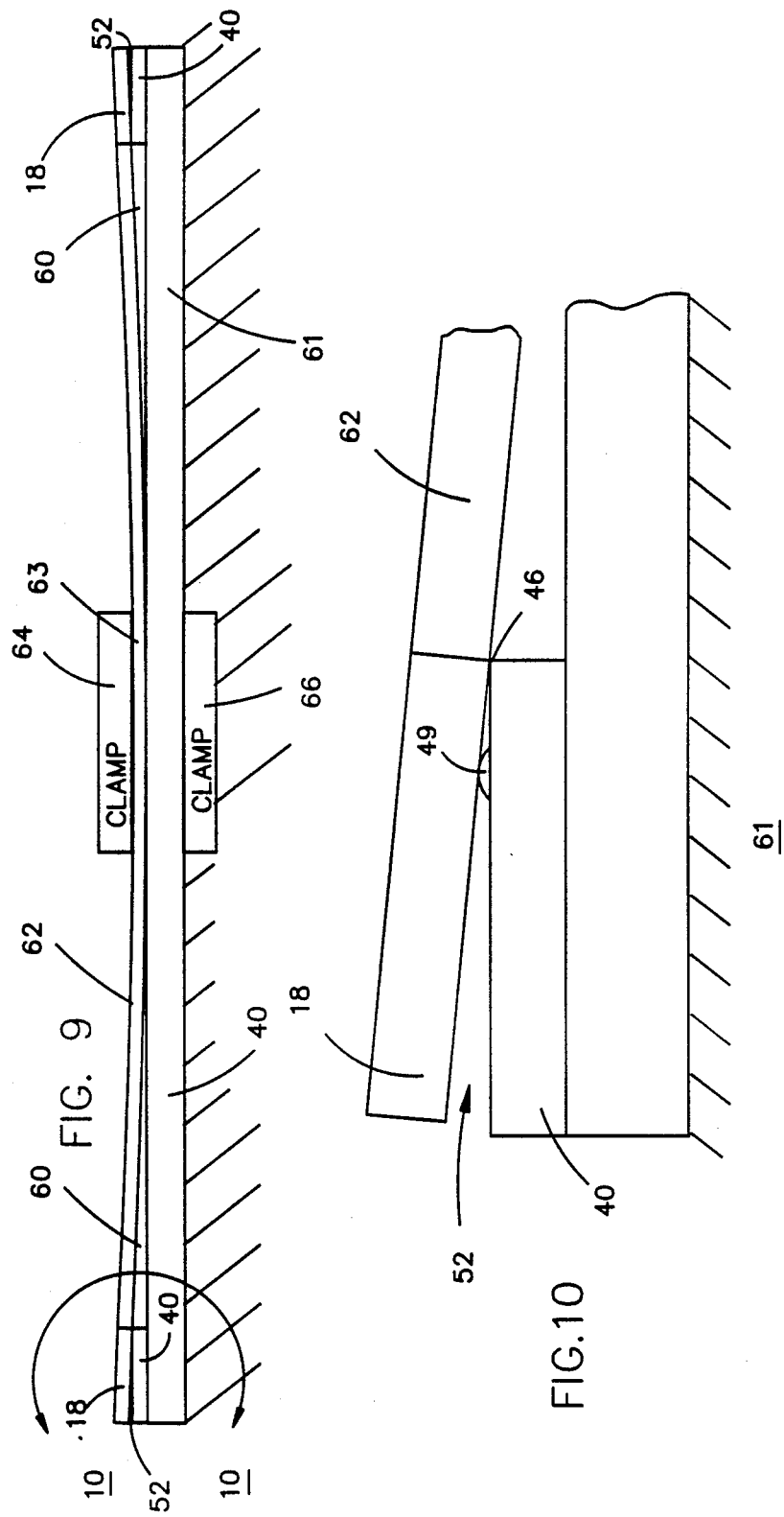

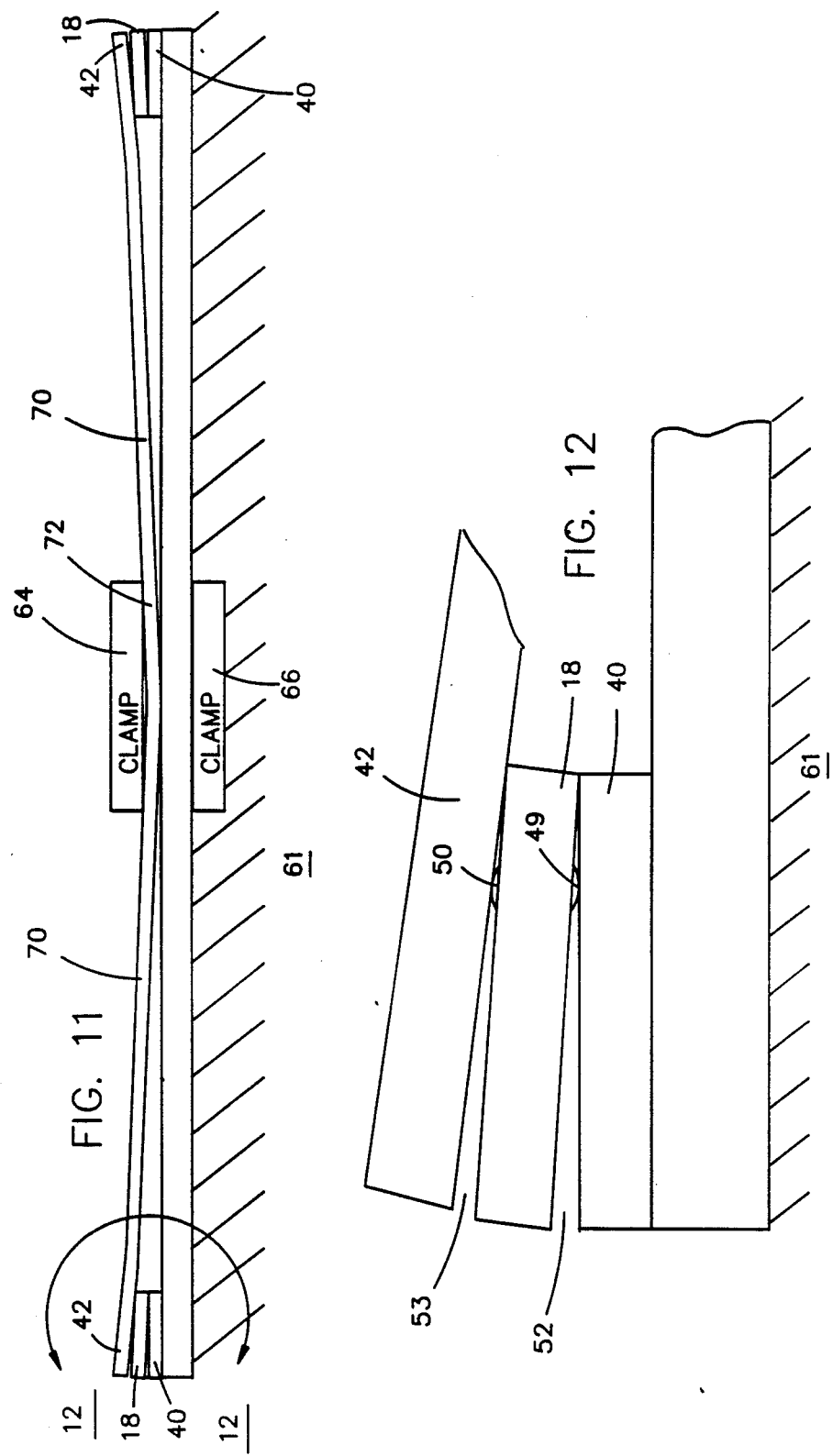

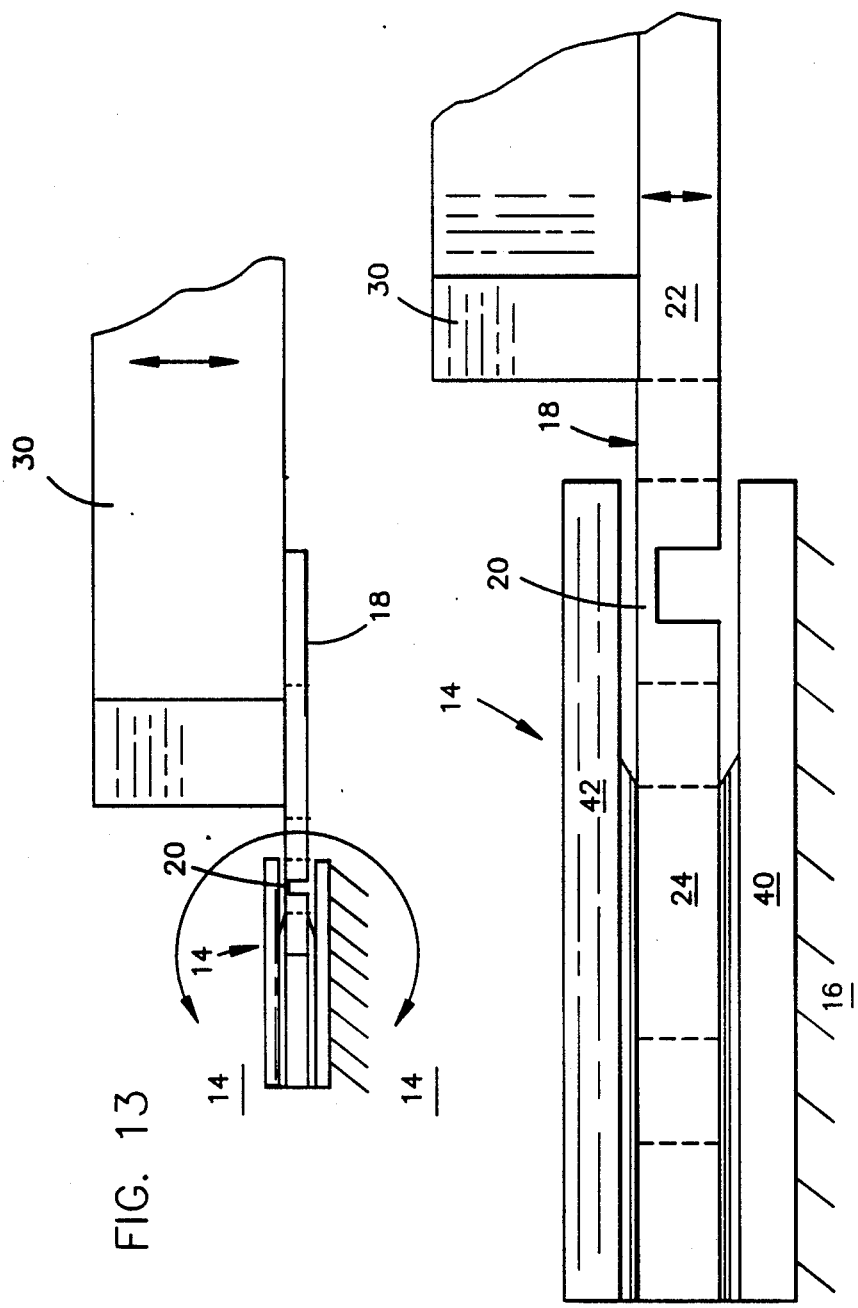

PROTECTED HINGE ASSEMBLY FOR MECHANICAL ACCELEROMETER

TECHNICAL FIELD

This invention pertains to a flexure-hinge assembly for an inertial type motion sensing instrument or accelerometer. More particularly, it pertains to a structure for supporting a flexure-hinge and its supported inertial sensing element relative to a supporting vehicle.

BACKGROUND ART

One form of prior-art structure for an inertial type mechanical accelerometer is shown in U.S. Pat. No. 4,788,864 which issued Dec. 6, 1988 to Nicholas F. Pier, the inventor herein, for a BLEED PATH FOR ELECTRIC CHARGE. The patent is assigned to Litton Systems, Inc., the assignee of this application. The bleed apparatus of that patent is not shown, but it might be used with the accelerometer element supported by the hinge frame of this invention.

DISCLOSURE OF INVENTION

An inertial accelerometer may be configured with a weight, called a sensing mass, supported by a hinge frame relative to the object, or supporting vehicle, whose acceleration is measured.

The hinge frame is built with a flexible web or hinge to allow a first part of such frame to bend at such hinge relative to the remaining or second part of such frame. Usually the first part of the frame supports the weight or sensing mass, and the second part is attached to the object whose acceleration is measured. As the mass starts to deflect, such deflection is sensed, and a servo, usually an electronically controlled servo, forces the first part and the sensing mass back to its zero-acceleration position. The second part of the hinge frame is usually solidly clamped and held between two stronger mechanical members which are designed to hold it under high acceleration or shock conditions.

Unfortunately, under acceleration exceeding the design range of the accelerometer or under mechanical shock conditions, such as that encountered under acceleration of rockets or that encountered if the apparatus is dropped, the servos and forces are usually incapable of holding the first part at its centered position, and forces large enough to break the hinge are delivered from the sensing mass to the hinges.

To avoid breaking the hinge, the modified hinge assembly of this invention allows the first region of the second part of the hinge frame, that is adjacent the hinge, to move slightly under excessive acceleration to relieve the hinge and prevent its damage.

In the invention, the second part of the hinge frame is still held between two stronger members or stops which are welded to the second part of the hinge frame. Before welding, however, tilt those two stops about a tilt line which preferably is substantially perpendicular to the hinge line of the hinges. The tilt line is offset, in a direction parallel to the hinge line, in a region called a second region of the second part of the hinge frame, away from the hinge. Weld the hinge frame and the two stops along a weld line in the second region adjacent the tilt line. In a preferred embodiment there are at least two welds, and the weld line is preferably aligned substantially parallel to the tilt line.

Tilting of the stops, relative to the hinge frame, produces a small gap between the stops and the first region of the hinge frame part that is aligned with and adjacent the flexure hinge. The clamping makes the second part rigid, but the gap adjacent the hinge allows that first region of the second part adjacent the hinge to deflect slightly under high acceleration to protect the hinge.

In the novel method to produce the tilted stops:

(1) Lay a pair of spaced-apart lower stops, which are connected by a first spacer, upon a flat supporting bench or table. Such combination is called herein a lower stop assembly. (2) Preferably attach it to the bench or table. (3) Lay spaced-apart hinge frames, connected by a second spacer whose spacing places the hinge frames in alignment with the lower stops. Such combination is called herein a hinge frame assembly. This is to be distinguished from a hinge assembly which is a single hinge frame between two stops. (4) To tilt the two hinge frames about the inner edges of the stops relative to the lower stops, force the center of the first spacer downward against the supporting bench or table, and clamp it in place at its center. (4) While holding the hinge frames in their tilted positions, weld them to the lower stops. The welds are at predetermined weld lines adjacent the aforementioned tilt lines. (4A) Then optionally remove the first spacer. The two assemblies remain attached by the second spacer.

Keep the spaced-apart assemblies, connected by at least the second spacer, in place with the hinge frames on top, upon the flat supporting bench or table. (5) A pair of spaced-apart upper stops, connected by a third spacer, are set over and in alignment with the hinge frames. (6) Force the center of the third spacer down against the supporting bench or table, and (7) clamp it in place at that center, thereby tilting the two upper stops, about the edges of the upper stop and hinge frame, relative to the hinge frame. Next weld the upper stops, while holding them in their tilted positions, to the hinge frames. The welds are at the predetermined weld lines adjacent the afore-mentioned inner edges. (8A) Then optionally remove the second spacer.

The two spaced-apart finished assemblies may optionally be held together by the second spacer until they are fastened in place for use and until the sensing mass and its associated support bracket are attached to the first parts of the two hinge frames.

ALTERNATE METHODS

It is apparent that rather than placing the hinge frame assembly over the lower stop assembly, one might place the lower stop assembly over the hinge frame assembly, tilt the lower stops, and weld them to the hinge frames.

It is also apparent that to attach the upper stops to the other surface of the hinge frame, one would need to detach the connected hinge frame and lower stop assemblies from the bench or table.

It is likewise apparent that either (1) the two attached assemblies would need to be turned over, exposing the hinge frames, and re-attached to the bench or table before the upper stop assembly was placed over the hinge frame assembly; or (2) the upper stop assembly would need to be attached to the bench or table and the attached hinge frame and lower stop assemblies placed over the upper stop assembly, the hinge frame tilted relative to the upper stop assembly, and the upper stop and hinge frame assemblies are connected.

It should also be apparent that with the lower stop assembly under the hinge frame assembly, it is still within the spirit and scope of the invention to attach the upper stop assembly to the bench or table and detach the connected lower stop and hinge frame assemblies from the bench or table and turn them over before placing them over the upper stop assembly for tilting and attaching.

It is also apparent that although welding appears to be the preferred method for connecting the elements, other methods such as, for example, those using adhesives are appropriate. If the elements are not fabricated of metal, other methods for connecting the elements may need to be used.

The method of the invention is described with the assemblies using spacers between a pair of hinge frames or stops. Some of the spacers have pads, substantially at their center, to facilitate clamping or connecting of the center point of the spacers to the bench or table. The bench or table are described as flat and so are the pads.

It is apparent that if a non-flat bench or table were used, it would be desirable to contour the pads to the bench or table so they might more easily be clamped to the table.

It is also apparent that the spacers need not have pads before they can be clamped to the bench or table.

Further it is apparent that the attachment of a spacer to the bench or table need not be by clamp, and it is intended that other equivalent means for attaching the spacer are to be embraced herein by the word, "attaching."

Likewise it is apparent that if one desired or could tolerate different tilt angles on the two spaced-apart connected-together hinge assemblies, the spacer need not be clamped at its center.

Usually two hinge assemblies are used together, the first parts of their hinge frames are attached to a common yoke which supports the sensing mass of an inertial accelerometer, and the length of the spacer typically spaces the assemblies to match the yoke. The use of the spacer as a means for tilting the members of the two hinge assemblies obscures the fact that when the spacer is so used, it is acting as two struts.

Thus, a single hinge assembly could be constructed according to the spirit and scope of the invention by merely cutting the spacer into two struts and discarding one strut and its attached elements. Alternatively, single hinge frames and stops could be fabricated with cantilevered struts extending from the second regions of the stops or the second part of the hinge frame. The elements would be placed on top of each other, and a strut of the top member would be clamped to the bench to tip that top member relative to the bottom member. The two members could then be connected together, for example, by welding. Note that the clamping or connecting need not be at the end of the strut.

The method of this invention could be used outside of the accelerometer art. For example, one might place a second structural member over a first structural member. The second member would have a strut that is then clamped to the table, and the two members would then be connected, while the strut is clamped, to form a composite structure. Note that the tilt need not be along a straight line, and the opposing surfaces need not be flat, so long as the tilted member conforms sufficiently at several connecting points that the connection can be completed.

The members could have planar surfaces and the edge of the second member could be straight to tilt along one edge. Note it is only the tilted member that need have such a generally straight edge.

It should also be clear that although attaching three members has been described herein, stacking additional members onto the three members is within the spirit and scope of the invention. To avoid long excursions of the struts, or spacers as struts, a region of the bench or table could be raised or built up, and the strut or spacer clamped to the raised or built up region.

It is therefore a feature and object of this invention to strengthen the hinge assemblies of inertia type accelerometers.

More specifically, it is a feature and object of this invention to provide clearance for the hinge frames of such accelerometers so that the clamped portions of the hinge frames may flex slightly during large accelerations and shocks, thereby to avoid damaging the accelerometers.

It is still a more specific feature of the invention to introduce a method, including a novel fixture, for fabricating such new and improved hinge assemblies.

The features and object of this invention further encompass methods for fabricating hinge assemblies and for fabricating composite structures wherein elements thereof are assembled and connected tilted one from another.

The invention further includes the product of the method claims herein.

Other features will become apparent from the following description, taken together with the accompanying drawings.

BRIEF DESCRIPTION OF DRAWINGS

FIG. 2 is a partly schematic view of a hinge frame according to the prior art.

FIG. 3 is a plan view of the prior art hinge frame of FIG. 2.

FIG. 4 is a plan view, according to a first embodiment of the invention, of a lower stop assembly having a pair of lower stops, with spacer therebetween.

FIG. 5 is a plan view, according to such first embodiment of the invention, of a hinge frame assembly having a pair of hinge frames, with spacer therebetween.

FIG. 6 is a plan view, according to the first embodiment of the invention, of an upper stop assembly having a pair of upper stops, with spacer therebetween.

FIG. 7 is a plan view of the lower stop assembly, according to FIG. 4, positioned on a bench or table, under and in alignment with the hinge frame assembly, preparatory to clamping or connecting the spacer of the hinge frame assembly to the bench or table.

FIG. 8 is a plan view, according to FIG. 6, of the upper stop assembly, positioned over and in alignment with the hinge frame assembly and lower stop assembly according to FIG. 7, preparatory to clamping or connecting the spacer of the upper stop assembly to the bench or table.

FIG. 9 is a view, taken at 9—9 in FIG. 7, showing the spacer of the hinge frame assembly clamped to the supporting bench or table, tilting the hinge frames on the lower stops preparatory to welding the hinge frames to the lower stops.

FIG. 10 is an enlarged view, taken in the region of 10—10, of FIG. 9.

FIG. 11 is a view, taken at 11—11 in FIG. 8, showing the spacer of the upper stop assembly clamped to the supporting bench or table, tilting the upper stops on the hinge frames preparatory to welding the upper stops to the hinge frames.

FIG. 12 is an enlarged view, taken in the region of 12—12, of FIG. 11.

FIG. 13 is a view, taken from the position of 13—13 of FIG. 8, but after the welding shown in FIGS. 9–12 is completed, showing a part of a sensing mass and its associated frame supported thereon.

FIG. 14 is a fragmentary view, taken at 14—14 of FIG. 13.

BEST MODE FOR CARRYING OUT THE INVENTION

1. Preferred Apparatus

Figure 1:
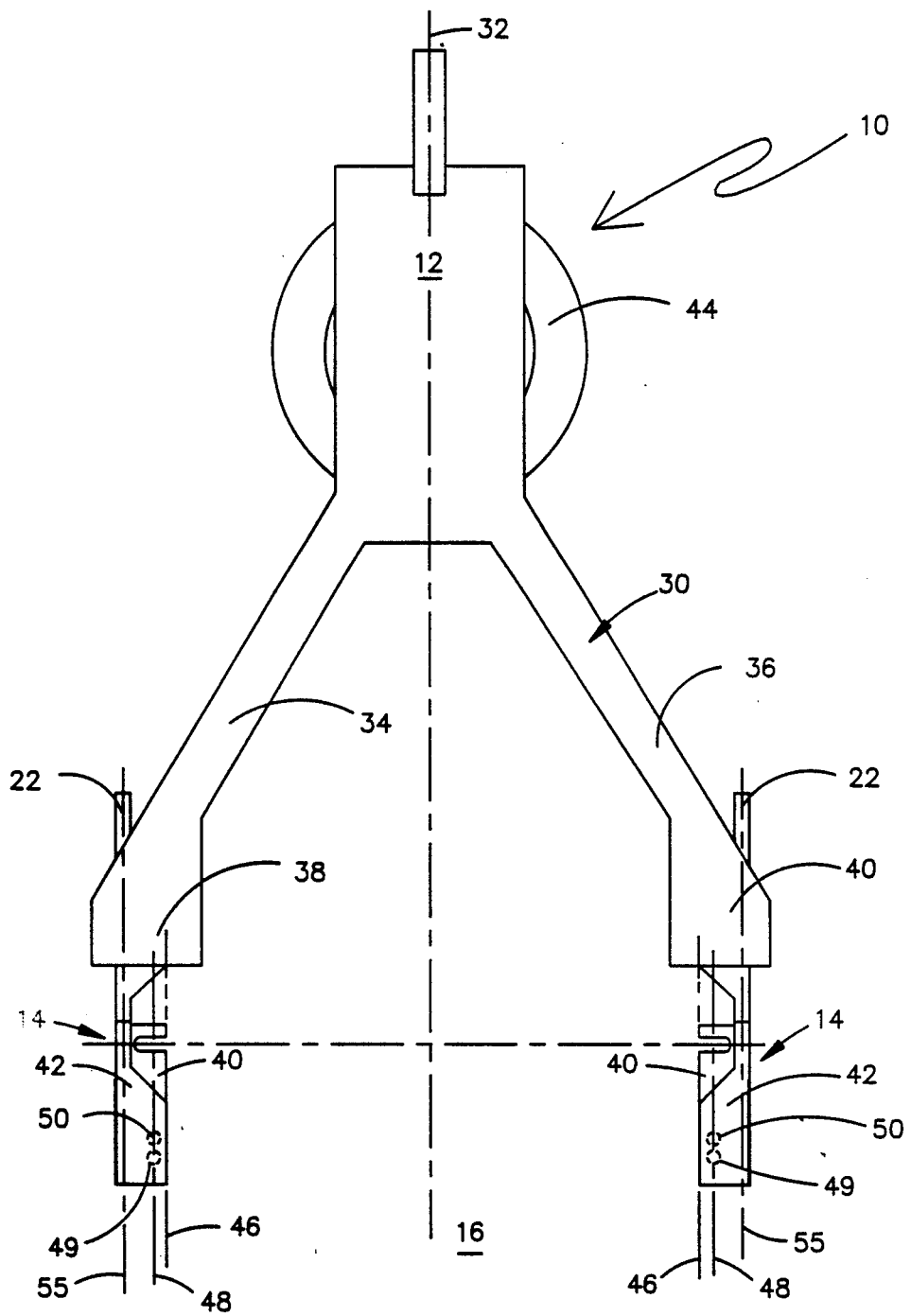
FIG. 1 is a plan view of the hinge assembly of this invention, attached to a sensing mass and its associated supporting frame, forcer, and displacement sensor.

An inertial sensor 10 may be configured, as shown in FIG. 1, with a weight 12, called a sensing mass, supported by a flexure-hinge structure 14 relative to the object, or supporting vehicle 16 whose acceleration is being measured. A sensor 32 detects deflection of weight 12, and a servo amplifier (not shown) receives the signal from sensor 32. The servo amplifier drives the forcer 44 to re-center the weight 12. The current to forcer 44 is a measure of restoring force and of sensed acceleration.

The instrument has a range of measurable accelerations, and that range is limited by the power available from the servo amplifier (not shown) and the ability of the forcer 44 to accept currents exceeding those required for operation within its design range. It is also limited by the inertia of the system. When accelerations, outside of the design range of the instrument, are received, or when a mechanical shock is received, the weight 12 hits its stops (not shown), and a heavy mechanical load is transferred to and across the hinges that align the weight 12. Usually the hinge assemblies 14 have a hinge 20 that aligns the weight 12 but does not support it. The hinge is pliable. Delivering shocks to the hinge might break it unless the delivered energy is absorbed by another element as in the apparatus of this invention.

A flexure-hinge assembly 14 has a hinge frame 18 which frequently is configured with a flexible web or hinge 20 allowing a first part 22 of such frame to bend about a hinge line 21 relative to the remaining or second part 24 of such frame. Usually the first part 22 of the frame 18 is attached to the weight or sensing mass 12; the second part 24 is attached to the object 16 whose acceleration is to be measured. As the mass starts to deflect, such deflection is sensed, and a servo (not shown), usually an electronically controlled servo, forces the first part 22 and the sensing mass 12 back to its centered position.

In the prior art the second part 24 of the frame is usually solidly clamped and held between two stronger mechanical members (not shown) which are designed to hold it even under high acceleration or shock. The sensing weight or mass 12 is usually attached, for example by a yoke structure 30, spanning the space between two structures 14, as shown in FIG. 1, to the parts 22 of the frames 18. Frequently the yoke structure 30 is bifurcated and symmetrical relative to a plane 32, having individual structural members 34, 36 connecting the mass or weight 12 to blocks or pad structures 38 and 40 which are attached to the parts 22.

A typical prior art accelerometer apparatus is shown, partly schematically, in FIGS. 2 and 3 where the part 24 is shown symbolically attached to the vehicle 16. A pair of stops 26 and 28 limit the part 22 from excessive travel. Under high acceleration or shock conditions, such as that encountered under acceleration of rockets or that encountered if the apparatus is dropped, the servos (not shown) and forcers 44 are insufficient to hold the mass 12 and the first part 22 at its centered position, and large forces are delivered from the sensing mass 12, through the part 22, to the hinge 20. The hinge 20 is not designed to carry large forces, and although stops 26 and 28 absorb some of the energy, the hinge 20 frequently breaks.

The modified hinge structure 14 of this invention avoids breaking the hinge 20 when the apparatus is subjected to high accelerations or mechanical shocks.

When large accelerations and shocks are received, the tilted holding members or stops, such as tilted lower stop 40 and tilted upper stop 42, attached to a region 53 of part two of the hinge frame, which is remote and offset from hinge 20 allows a small movement of a region 54, which is adjacent hinge 20, of the second part 24 without damaging the hinge 20. Region 54 is designated the first region, and region 53 is designated the second region of the second part 24.

The second region 53 of the second part 24 of the hinge frame 18 is still held between two stronger members or stops 40, 42 which are welded to such second region. However, before welding, those two stronger members 40, 42 are tilted, preferably about a tilt line 46 which is perpendicular to the hinge line of the flexure hinges. The tilt line 46 is offset into said second region 53, in the direction of the hinge line, from the flexure hinge 20, and it is preferably adjacent the outer edge of such second region.

In a most preferred embodiment of the apparatus, the two welds 49, 50, are aligned on a weld line 48 which is substantially parallel to the outer edge of the second region 53.

Tilting of the stops 40, 42, relative to the frames 18, produces small gaps 52 and 53 between the stops 40, 42 and the first region 54 of the second part 24. The first regions 54 are aligned on axes 55 with the flexure hinge 20 so that under shock or large acceleration, the first region 54 may deflect slightly to absorb part of the energy of excessive acceleration and mechanical shocks.

2. Most Preferred Embodiment of Method

In the novel method to produce the hinge assembly of this invention, first manufacture upper stop, lower stop, and hinge frame assemblies. The upper stop assembly has two upper stops 42 separated by a spacer 70. Substantially in the center of the spacer 70 may be a clamping or connecting pad 72. The hinge frame assembly has two hinge frames 18 separated by a spacer 62. Substantially in the center of the spacer 62 may be a clamping or connecting pad 63. The lower stop assembly has two lower stops 40 separated by a spacer 60. Substantially in the center of the spacer 60 may be a clamping or connecting pad (not shown).

The spacer 62 is attached to the second region 53 of the second part 24 of the hinge frames 18. The spacer 60 is attached to the second region 53A of the stops 40. The spacer 70 is attached to the second region 53B of the stops 42.

The lower stop assembly is attached in place upon a supporting bench or table 61. A hinge frame assembly is placed above the lower stop assembly with the second part of the hinge frames 18 aligned with the lower stops 40. The pad 63 is forced down against the supporting bench or table 61 and clamped by clamps 64, 66, thereby tilting the two hinge frames 18, about the edges 46 of the stops 40, relative to the stops 40. The hinge frames 18, while in their tilted positions, are welded, preferably on predetermined weld lines 48 adjacent the edges 46, to the lower stops 40. The spacer 62 and pad 63 may optionally then be removed. The two lower stop and hinge frame connected assemblies remain connected and spaced apart by at least the spacer 60.

An upper stop assembly is placed above the hinge frame assembly with the upper stops 42 aligned with the second part 24 of the hinge frames 18. The center pad 72 of the third spacer is forced down against the supporting bench or table 61 and clamped in place, thereby tilting the two upper stops 42, about the edges of the hinge frame 18, relative to the hinge frame 18. While held in their tilted positions, the upper stops are welded to the hinge frames. The welds 49 and 50 are on the predetermined weld lines 48 adjacent the afore-mentioned inner edges. The first spacer 60 is then optionally removed. It is not unusual for two spaced-apart accelerometer assemblies to be attached to the arms 34, 36 of a yoke which supports the sensing mass 12. It might be convenient to require that the length of the spacers 60, 62 and 72 are correct to match the separation of the yoke arms 34, 36. So the spacers 60, 62 and 70 may remain attached until after the hinge assemblies are connected to the yoke arms.

The spacers 60, 62 and 70 may be removed when convenient

The completed assemblies 14 are shown in FIGS. 13 and 14 attached for use to the yoke 30.

2. Permutations of Assembly Steps of the Preferred Method

Permutations of the assembly steps of the preferred method are also embraced within this invention.

a. First permutation

In the first steps of the preferred method, instead of attaching the lower stop assembly to a bench or table, the hinge frame assembly could have been placed on and attached to the table, and the lower stop assembly could have been placed over the lower stop assembly with the lower stops 40 aligned with the hinge frames 18. The lower stops could then be tilted by clamping or connecting the center of the spacer 60 to the bench or table 61. (The spacer 60 could, optionally have a clamping or connecting pad at the center thereof.) The upper stop assembly could then be connected by one or the other of the following sub-permutations of the method of the invention.

a1. First Subpermutation

The connected lower stop assembly and hinge frame assembly can be turned over, and the upper stop assembly can be attached as described for the preferred method.

a2. Second Subpermutation of the Preferred Method

The upper stop assembly could be attached to the bench or table. The connected lower stop assembly and hinge frame assembly would be turned over to place the hinge frame assembly between the upper and lower stop assemblies.

3. The Preferred Method and its Permutations-Using Struts

A preferred method and four of its permutations have been described. The spacers 60, 62 and 70 are not only spacers, but are also levers for tilting the stops or hinge frame. Consider, for example, FIG. 9. The clamps 64, 66 clamp the pad 63 to the table 61 to tilt the elements 18 relative to the elements 40. The spacer 62 could be cut in half without affecting the tilting of the members 18. Thus, it appears that the stacks could be fabricated separately, and instead of spacers, the region 53, 53A or 53B could support a strut that is equal in length to one-half of a spacer. Each of the above-described methods can be repeated using just part of the space bar as a strut. It is intended that such methods shall be within the spirit and scope of the invention, and all of such methods are claimed herein.

4. Generalized Methods of the Invention Applied to Accelerometers

The specific shapes of the hinge frame 18, its parts 22, 24, and the stops 40, 42 have evolved over several redesigns to reduce the weights, to modify the inertias, to adjust the spring constants and the resilience of the material.

When considering the application to accelerometers, it is apparent that the specific shape of the first part 22 of the hinge frame 18 need not be the specific shape shown in the drawings. It must be large enough and have an adequate shape that it can be attached in some manner to the weight or sensing mass 12.

So, too, the second part 24 need not be of the shown shape. It is important that it not be clamped in the region 54 so that the region 54 may move slightly in response to mechanical shocks and excessive acceleration.

The stops must be in position with only small gaps between the region 54 of opposite surfaces of the part 24 and the stops. For a given accelerometer it will be known how far the region 54 can travel without damage to the accelerometer. The stops must overlie the regions 54 to snub that region. Tilting of the stops is a preferred method for obtaining the small desired clearances.

Note that the shape of the part 24 is not critical.

5. Generalized Methods of the Invention—Not Applied to Accelerometers

Consider two pieces of material, such as a metal, one lying above the other. The top piece has a strut extending thereon and lies sufficiently near the edge of the lower piece that the strut can be pressed down onto the supporting bench or table. The edge of the top piece is complementary to the surface of the lower piece in the sense that the top piece can be tilted, and when it is tilted the edge upon which it is tilted conforms generally to the surface contour of the lower piece.

The top piece is placed over the lower piece, and the strut is clamped to the supporting bench. The two pieces are then connected or welded to form a composite structure.

More specifically, perhaps, the bottom piece has a substantially flat upper surface, and the tilt edge of the top piece is substantially a straight line. The strut is clamped down to the bench, and the two pieces are welded to form a composite structure.

It may also be seen that more than two or three elements may be, if desired, stacked one onto the other, the pieces may be tilted by pushing down on an attached strut, and the elements may be welded in place.

Although the invention has been described in detail above, it is not to be limited by that detail, but only by the claims supported by the specification.

I claim:

1. A protected hinge assembly comprising:

a hinge frame having first and second parts which have substantially flat opposite surfaces each having first and second juxtaposed regions near first and second substantially opposite side edges thereof, said first regions of said first and second parts being connected by a flexible hinge having a hinge line directed in a predetermined first direction;

first and second stops, substantially rigidly attached along second and third lines to opposite surfaces, in said second regions near and substantially parallel to the outer edges of said second parts of said surfaces and being substantially perpendicular to said hinge line;

said stops being tilted substantially about said second and third lines relative to said surfaces to allow slight movement of the first regions of said second part relative to said stops.

2. Apparatus as recited in claim 1 in which said first part of said hinge frame is adapted to attach to the movable sensing mass of an accelerometer, and said second part is adapted to be attached to apparatus whose acceleration is measured.

3. Apparatus as recited in claim 2 and further comprising a servo-restored sensing mass attached to said first part.

4. Apparatus as recited in claim 2 in which said parts of said hinge frame are substantially rectangular, said first and second regions of said surfaces have a common boundary extending from one short edge to the other, said second and third lines are directed substantially parallel to and adjacent to the longer outside edges of the second regions of said parts, and said hinge is attached to the shorter edge of said parts with said hinge line directed substantially parallel to said shorter side of said parts.

5. A method for attaching metallic members comprising:
    placing and temporarily attaching a first said member to a bench;
    placing a second said member over said first member;
    tilting said second member relative to said first member with one edge of said second member in contact with one surface of said first member along a fulcrum of tilt;
    attaching said second member to said first member in the region of the line of contact between said first and second members.

6. A method as recited in claim 5 in which the facing surfaces of said first and second members conform.

7. A method as recited in claim 5 in which said surfaces are substantially planar.

8. A method as recited in claim 7 in which at least one edge of each of the facing surfaces of said members are substantially straight, and the line of contact between said facing surfaces is substantially along that line.

9. A method as recited in claim 5 in which said second member has a strut attached thereto;
    said strut is clamped to said bench to tilt said second member relative to said first member; and
    said two members are connected adjacent their common fulcrum of tilt.

10. A method for attaching substantially planar metallic members comprising:
    placing and temporarily attaching a first said member to a bench;
    placing a second said member over said first member with first edges of first surfaces of each of said two members aligned to form a common edge;
    tilting said second member relative to said first member about said common edge; and
    rigidly attaching said tilted members at their said common edge.

11. The method of claim 10 in which said second member has a strut thereon that is pressed toward said bench to tilt said second member relative to said first member.

12. A method as recited in claim 10 and further comprising placing a third member over said second member with first edges of a first surface of said third member and of a second face of said second member aligned to form a second common edge;
    tilting said third member relative to said second member about said second common edge; and
    rigidly attaching said tilted members at their second common edge to permanently tilt said third member relative to said first and second members.

13. The method of claim 12 in which said third member has a strut thereon that is pressed toward said bench to tilt said third member relative to said first two members.

14. A method as recited in claim 10 and further comprising:
    turning said first and second attached members over, and attaching said second member to said bench;
    placing a third member over said first member with first edges of a first surface of said third member and of a second surface of said first member aligned to form a second common edge;
    tilting said third member relative to said first member about said second common edge; and
    rigidly attaching said tilted members at their second common edge to permanently tilt said third member relative to said first and second members.

15. The method of claim 14 in which said third member has a strut thereon that is pressed toward said bench to tilt said third member relative to said first two members.

16. A method for making a protected hinge assembly comprising:
    making two hinge frames, spaced apart by a first spacer to form a hinge frame assembly, each said frame having first and second parts, each part with substantially flat parallel opposite surfaces, each said surface having first and second juxtaposed regions, said first regions being on the side away from said spacer, having a hinge line, in a first predetermined direction, connecting said first part to said second part at said first regions of said surfaces, said spacer being attached to said second part at said second regions of said surfaces;
    making two lower stops spaced apart by a second spacer substantially the same length as said first spacer to form a lower stop assembly, and two upper stops spaced apart by a third spacer substantially the same length as said first two spacers to form an upper stop assembly, each said stop being configured to substantially the size and shape of the second part of one of said hinge frames, at least the same surface of each said stop having first and second juxtaposed regions with said spacer being attached to said stops at said second regions;
    placing and temporarily attaching said spaced apart lower stop assembly onto a bench;

positioning said hinge frame assembly over said lower stop assembly with at least the outer edges of said second regions of the downwardly directed surfaces of said hinge frames and the outer edges of said second regions of said lower stops being substantially parallel;

clamping a portion of said hinge frame assembly spacer to said table to tilt said hinge frames relative to said lower stops about tilt lines adjacent and substantially parallel to said outer edges of the second regions of the adjacent surfaces of said hinge frames and said lower stops;

attaching together said hinge frames and lower stops along an attachment line in said second regions of the attached surfaces near said tilt lines, to hold them in their relative tilted positions to create gaps between the first regions of one surface of said second part of each said hinge frame and the first regions of one surface of each said lower stop;

positioning said upper stop assembly over said hinge frame assembly with at least the outer edges of said second regions of the upwardly directed surfaces of said hinge frames and of said second regions of the adjacent downwardly directed surfaces of said upper stops being substantially parallel;

clamping a portion of said upper stop spacer to said table to tilt said upper stops about tilt lines adjacent and substantially parallel to said outer edges of the adjacent surfaces of said hinge frames and said upper stops;

attaching together said upper stops and said hinge frames along attachment lines in said second regions of the attached surfaces near said last-named tilt lines to hold them in their relative tilted positions to create gaps between the first region of one surface of said second part of each of said hinge frame and one surface of each said upper stop.

17. The method of claim 16 in which at least said stops and said second part of said hinge frame are substantially rectangular, and the common boundaries of said regions of each said surface extend from one of its short sides to the other.

18. The method of claim 17 in which said bench surface is substantially flat, said clamped spacers have substantially planar-surfaced pads substantially at their center, and said clamping is between said pads and said bench.

19. The method of claim 17 and further compriising the steps of removing said spacers from said hinge frame assembly and said stop assemblies after such spacers are no longer needed for spacing or tilting said hinge frames and stops.

20. The method of claim 17 in which said attaching is welding.

21. A method for making a protected hinge assembly comprising:

making two hinge frames, spaced apart by a first spacer to form a hinge frame assembly, each said frame having first and second parts, each part with substantially flat parallel opposite surfaces, each surface having first and second juxtaposed regions, said first regions being on the side away from said spacer, having a hinge line, in a first predetermined direction, connecting said first part to said second part at said first regions of said surfaces, said spacer being attached to said second part at said second regions of said surfaces;

making two lower stops spaced apart by a second spacer substantially the same length as said first spacer to form a lower stop assembly, and two upper stops spaced apart by a third spacer substantially the same length as said first two spacers to form an upper stop assembly, each said stop being configured to substantially the size and shape of the second part of one of said hinge frames, at least the same surface of each said stop having first and second juxtaposed regions with said spacer being attached to said stops at said second regions;

placing and temporarily attaching said spaced apart lower stop assembly onto a bench;

positioning said hinge frame assembly over said lower stop assembly with at least the outer edges of said second regions of the downwardly directed surfaces of said hinge frames and the outer edges of said second regions of said lower stops being substantially parallel;

clamping a portion of said hinge frame assembly spacer to said table to tilt said hinge frames relative to said lower stops about tilt lines adjacent and substantially parallel to said outer edges of the second regions of the adjacent surfaces of said hinge frames and said lower stops;

attaching together said hinge frames and lower stops along an attachment line in said second regions of the attached surfaces near said tilt lines, to hold them in their relative tilted positions to create gaps between the first regions of one surface of said second part of each said hinge frame and the first regions of one surface of each said lower stop;

positioning said upper stop assembly over said hinge frame assembly with at least the outer edges of said second regions of the upwardly directed surfaces of said hinge frames and of said second regions of the adjacent downwardly directed surfaces of said upper stops being substantially parallel;

clamping a portion of said upper stop spacer to said table to tilt said upper stops about tilt lines adjacent and substantially parallel to said outer edges of the adjacent surfaces of said hinge frames and said upper stops;

attaching together said upper stops and said hinge frames along attachment lines in said second regions of the attached surfaces near said last-named tilt lines to hold them in their relative tilted positions to create gaps between the first region of one surface of said second part of each of said hinge frame and one surface of each said upper stop placing and temporarily attaching said upper stop assembly onto a bench;

positioning said hinge frame assembly over said upper stop assembly with at least the outer edges of said second regions of the upwardly directed surfaces of said upper stops and the downwardly directed surfaces of said hinge frames being substantially parallel, said edges being substantially perpendicular to said hinge line and to the lever arm of its said spacers;

clamping a portion of said hinge frame spacer to said table to tilt said hinge frames and lower stops relative to said upper stops about tilt lines adjacent and substantially parallel to said outer edges of the second regions of the adjacent surfaces of said hinge frames and said upper stops;

attaching together said hinge frames and upper stops near said last-named tilt lines to hold them in their relative tilted position to create gaps between the first regions of one face of said second part of said hinge frame and the first regions of said upper stops.

22. The method of claim 21 in which at least said stops and said second part of said hinge frame are substantially rectangular, and the common boundaries of said regions of each said surface extend from one of its short sides to the other.

23. The method of claim 22 in which said bench surface is substantially flat, said clamped spacers have substantially planar-surfaced pads substantially at their center, and said clamping is between said pads and said bench.

24. The method of claim 22 and further comprising the steps of removing said spacers from said hinge frame assembly and said stop assemblies after such spacers are no longer needed for spacing or tilting said hinge frames and stops.

25. The method of claim 22 in which said attaching is welding.

26. A method for making a protected hinge assembly comprising:

making two hinge frames, spaced apart by a first spacer to form a hinge frame assembly, each said frame having first and second parts, each part with substantially flat parallel opposite surfaces, each said surface having first and second juxtaposed regions, said first regions being on the side away from said spacer, having a hinge line, in a first predetermined direction, connecting said first part to said second part at said first regions of said surfaces, said spacer being attached to said second part at said second regions of said surfaces;

placing and temporarily attaching said hinge frame assembly onto a bench;

positioning said lower stop assembly over said hinge frame assembly with at least the outer edges of said second regions of the upwardly directed surfaces of said hinge frames and the outer edges of the second regions of the downwardly directed surfaces of said lower stops being substantially parallel, said edges being substantially perpendicular to said hinge lines and to the lever arm of its said spacer;

clamping a portion of said lower stop spacer to said table to tilt said lower stops relative to said hinge frames about tilt lines adjacent and substantially parallel to said outer edges of the second regions of adjacent surfaces of said hinge frames and lower stops;

attaching together said hinge frames and lower stops along an attachment line in said second regions of the attached surfaces near said tilt lines, to hold them in their relative tilted positions to create gaps between the first regions of one surface of said second part of each said hinge frame and the first regions of one surface of each said lower stop;

placing and temporarily attaching said upper stop assembly onto a bench;

positioning said hinge frame assembly over said upper stop assembly with at least the outer edges of said second regions of the upwardly directed surfaces of said upper stops and the downwardly directed surfaces of said hinge frames being substantially parallel, said edges being substantially perpendicular to said hinge line and to the lever arm of its said spacers;

clamping a portion of said hinge frame spacer to said table to tilt said hinge frames and lower stops relative to said upper stops about tilt lines adjacent and substantially parallel to said outer edges of the second regions of the adjacent surfaces of said hinge frames and said upper stops;

attaching together said hinge frames and upper stops near said last-named tilt lines to hold them in their relative tilted position to create gaps between the first regions of one face of said second part of said hinge frame and the first regions of said upper stops.

27. The method of claim 26 in which at least said stops and said second part of said hinge frame are substantially rectangular, and the common boundaries of said regions of each said surface extend from one of its short sides to the other.

28. The method of claim 27 in which said bench surface is substantially flat, said clamped spacers have substantially planar-surfaced pads substantially at their center, and said clamping is between said pads and said bench.

29. The method of claim 27 and further comprising the steps of removing said spacers from said hinge frame assembly and said stop assemblies after such spacers are no longer needed for spacing or tilting said hinge frames and stops.

30. The method of claim 27 in which said attaching is welding.

31. A method for making a protected hinge assembly comprising:

making two hinge frames, spaced apart by a first spacer to form a hinge frame assembly, each said frame having first and second parts, each part with substantially flat parallel opposite surfaces, each said surface having first and second juxtaposed regions, said first regions being on the side away from said spacer, having a hinge line, in a first predetermined direction, connecting said first part to said second part at said first regions of said surfaces, said spacer being attached to said second part at said second regions of said surfaces;

making two lower stops spaced apart by a second spacer substantially the same length as said first spacer to form a lower stop assembly, and two upper stops spaced apart by a third spacer substantially the same length as said first two spacers to form an upper stop assembly, each said stop being configured to substantially the size and shape of the second part of one of said hinge frames, at least the same surface of each said stop having first and second juxtaposed regions with said spacer being attached to said stops at said second regions;

placing and temporarily attaching said hinge frame assembly onto a bench;

positioning said lower stop assembly over said hinge frame assembly with at least the outer edges of said second regions of the upwardly directed surfaces of said hinge frames and the outer edges of the second regions of the downwardly directed surfaces of said lower stops being substantially parallel, said edges being substantially perpendicular to said hinge lines and to the lever arm of its said spacer;

clamping a portion of said lower stop spacer to said table to tilt said lower stops relative to said hinge frames about tilt lines adjacent and substantially parallel to said outer edges of the second regions of adjacent surfaces of said hinge frames and lower stops;

attaching together said hinge frames and lower stops along an attachment line in said second regions of the attached surfaces near said tilt lines, to hold them in their relative tilted positions to create gaps between the first regions of one surface of said second part of each said hinge frame and the first regions of one surface of each said lower stop;

removing said attached hinge frame and lower stop assemblies from said bench, and turning them over to place said hinge frame assembly on top;

positioning said upper stop assembly over said hinge frame assembly with at least the outer edges of said second regions of the upwardly directed surfaces of said hinge frames and of said second regions of the adjacent downwardly directed surfaces of said upper stops being substantially parallel;

clamping a portion of said upper stop spacer to said table to tilt said upper stops about tilt lines adjacent and substantially parallel to said outer edges of the adjacent surfaces of said hinge frames and said upper stops;

attaching together said upper stops and said hinge frames along attachment lines in said second regions of the attached surfaces near said last-named tilt lines to hold them in their relative tilted positions to create gaps between the first region of one surface of said second part of each of said hinge frame and one surface of each said upper stop.

32. The method of claim 31 in which at least said stops and said second part of said hinge frame are substantially rectangular, and the common boundaries of said regions of each said surface extend from one of its short sides to the other.

33. The method of claim 32 in which said bench surface is substantially flat, said clamped spacers have substantially planar-surfaced pads substantially at their center, and said clamping is between said pads and said bench.

34. The method of claim 32 and further compriising the steps of removing said spacers from said hinge frame assembly and said stop assemblies after such spacers are no longer needed for spacing or tilting said hinge frames and stops.

35. The method of claim 32 in which said attaching is welding.

36. A method for making a protected hinge assembly comprising:

making a hinge frame having first and second parts each with substantially flat parallel opposite surfaces, each said surface having first and second juxtaposed regions adjacent a first pair of opposite edges of such surface, the common boundary between said regions extending from one to the other of a second pair of opposite edges of said surfaces, a flexible hinge connecting said first region of said first part to said first region of said second part at one of said second pair of opposite edges, the hinge line of said hinge being directed in a predetermined direction, said hinge frame having a first strut extending from the outer edge of one of the first pair of said opposite edges at the second region of said second part;

making upper and lower stops, configured to substantially the size and shape of the second part of said hinge frame, at least a first surface of each said stop having first and second juxtaposed regions substantially identical to said first and second regions of said hinge frame;

placing and temporarily attaching said hinge frame onto a bench;

positioning said lower stop over said hinge frame with at least said first pair of outer edges of said second regions of the facing surfaces of said hinge frame and said lower stop being substantially aligned, said edges being substantially perpendicular to said hinge line, said lower stop having a second strut whose lever arm extends from the outer edge of one of said first pair of opposite edges at the second region of said lower stops;

clamping a portion of the end of said second strut to said bench to tilt said lower stop relative to said hinge frame about a tilt line adjacent and substantially parallel to said first of said opposite edges to which said second strut is attached;

attaching together said lower stop and said second part of said hinge frame, in said second regions, near said tilt line to hold said two members in their relative tilted position to create a gap between the first regions of the hinge frame and lower stop;

releasing said welded hinge frame and lower stop from said bench;

placing and attaching said upper stop onto said bench;

positioning said hinge frame and lower stop over said upper stop with said hinge frame adjacent said upper stop and at least the outer edges of said second regions of the facing surfaces of said upper stop and of said second part of said hinge frame being substantially aligned, said edges being substantially perpendicular to said hinge line;

clamping a portion of the outer end of said first strut to said table to tilt said hinge frame and lower stop relative to said upper stop about a tilt line adjacent and substantially parallel to said outer edges of said hinge frame and said upper stop;

attaching together said upper stop and said hinge frame near said last-named tilt line to hold said upper stop and hinge frame in their relative tilted position.

37. The method of claim 36 in which at least said stops and said second part of said hinge frame are substantially rectangular, and the common boundaries of said regions of each said surface extend from one of its short sides to the other.

38. The method of claim 37 in which said bench surface is substantially flat, said clamped spacers have substantially planar-surfaced pads substantially at their center, and said clamping is between said pads and said bench.

39. The method of claim 37 and further comprising the steps of removing said spacers from said hinge frame assembly and said stop assemblies after such spacers are no longer needed for spacing or tilting said hinge frames and stops.

40. The method of claim 37 in which said attaching is welding.

41. A method for making a protected hinge assembly comprising:

making a hinge frame having first and second parts each with substantially flat parallel opposite surfaces, each said surface having first and second juxtaposed regions adjacent a first pair of opposite edges of such surface, the common boundary between said regions extending from one to the other of a second pair of opposite edges of said surfaces, a flexible hinge connecting said first region of said first part to said first region of said second part at one of said second pair of opposite edges, the hinge line of said hinge being directed in a predetermined direction, said hinge frame having a first strut extending from the outer edge of one of the first pair of said opposite edges at the second region of said second part;

making upper and lower stops, configured to substantially the size and shape of the second part of said hinge frame, at least a first surface of each said stop having first and second juxtaposed regions substantially identical to said first and second regions of said hinge frame;

placing and temporarily attaching said hinge frame onto a bench;

positioning said lower stop over said hinge frame with at least said first pair of outer edges of said second regions of the facing surfaces of said hinge frame and said lower stop being substantially aligned, said edges being substantially perpendicular to said hinge line, said lower stop having a second strut whose lever arm extends from the outer edge of one of said first pair of opposite edges at the second region of said lower stops;

clamping a portion of the end of said second strut to said bench to tilt said lower stop relative to said hinge frame about a tilt line adjacent and substantially parallel to said first of said opposite edges to which said second strut is attached;

attaching together said lower stop and said second part of said hinge frame, in said second regions, near said tilt line to hold said two members in their relative tilted position to create a gap between the first regions of the hinge frame and lower stop;

releasing said welded hinge frame and lower stop from said bench;

placing and attaching said upper stop onto said bench;

positioning said hinge frame and lower stop over said upper stop with said hinge frame adjacent said upper stop and at least the outer edges of said second regions of the facing surfaces of said upper stop and of said second part of said hinge frame being substantially aligned, said edges being substantially perpendicular to said hinge line;

clamping a portion of the outer end of said first strut to said table to tilt said hinge frame and lower stop relative to said upper stop about a tilt line adjacent and substantially parallel to said outer edges of said hinge frame and said upper stop;

attaching together said upper stop and said hinge frame near said last-named tilt line to hold said upper stop and hinge frame in their relative tilted position.

42. The method of claim 41 in which at least said stops and said second part of said hinge frame are substantially rectangular, and the common boundaries of said regions of each said surface extend from one of its short sides to the other.

43. The method of claim 42 in which said bench surface is substantially flat, said clamped struts have substantially planar surfaced pads on their outer ends, and said clamping is between said pads and said bench.

44. The method of claim 42 and further comprising the steps of removing said struts from said hinge frames and said stops after such spacers are no longer needed for tilting said hinge frames and stops.

45. The method of claim 42 in which said attaching is welding.

46. A method for making a protected hinge assembly comprising:

making a hinge frame having first and second parts each with substantially flat parallel opposite surfaces, each said surface having first and second juxtaposed regions adjacent a first pair of opposite edges of such surface, the common boundary between said regions extending from one to the other of a second pair of opposite edges of said surfaces, a flexible hinge connecting said first region of said first part to said first region of said second part at one of said second pair of opposite edges, the hinge line of said hinge being directed in a predetermined direction, said hinge frame having a first strut extending from the outer edge of one of the first pair of said opposite edges at the second region of said second part;

making upper and lower stops, configured to substantially the size and shape of the second part of said hinge frame, at least a first surface of each said stop having first and second juxtaposed regions substantially identical to said first and second regions of said hinge frame;

placing and temporarily attaching said hinge frame onto a bench;

positioning said lower stop over said hinge frame with at least said first pair of outer edges of said second regions of the facing surfaces of said hinge frame and said lower stop being substantially aligned, said edges being substantially perpendicular to said hinge line, said lower stop having a second strut whose lever arm extends from the outer edge of one of said first pair of opposite edges at the second region of said lower stops;

clamping a portion of the end of said second strut to said bench to tilt said lower stop relative to said hinge frame about a tilt line adjacent and substantially parallel to said first of said opposite edges to which said second strut is attached;

attaching together said lower stop and said second part of said hinge frame, in said second regions, near said tilt line to hold said two members in their relative tilted position to create a gap between the first regions of the hinge frame and lower stop;

releasing said connected-together hinge frame and lower stop from said bench, turning it over and re-attaching said lower stop onto said bench.

positioning said upper stop over said hinge frame with at least the outer edges of said second regions of the facing surfaces of said upper stop and of said second part of said hinge frame being substantially aligned, said edges being substantially perpendicular to said hinge line, said upper stop having a second strut thereon, positioned to extend from the outer edge of said first pair of opposite edges at said second region of said upper stop;

clamping a portion of said first strut to said table to tilt said hinge frame relative to said lower stop about a tilt line adjacent and substantially parallel to said first opposite outer edges of said upper stop and said hinge frame;

attaching together said upper stop and said hinge frame near said last-named tilt line to hold said upper stop and hinge frames in their relative tilted position to create a gap between the first regions of the surfaces of said upper stop and hinge frames.

47. The method of claim 46 in which at least said stops and said second part of said hinge frame are substantially rectangular, and the common boundaries of said regions of each said surface extend from one of its short sides to the other.

48. The method of claim 47 in which said bench surface is substantially flat, said clamped struts have substantially planar surfaced pads on their outer ends, and said clamping is between said pads and said bench.

49. The method of claim 47 and further comprising the steps of removing said struts from said hinge frames and said stops after such spacers are no longer needed for tilting said hinge frames and stops.

50. The method of claim 47 in which said attaching is welding.

51. A method for making a protected hinge assembly comprising:

making a hinge frame having first and second parts each with substantially flat parallel opposite surfaces, each said surface having first and second juxtaposed regions adjacent a first pair of opposite edges of such surface, the common boundary between said regions extending from one to the other of a second pair of opposite edges of said surfaces, a flexible hinge connecting said first region of said first part to said first region of said second part at one of said second pair of opposite edges, the hinge line of said hinge being directed in a predetermined direction, said hinge frame having a first strut extending from the outer edge of one of the first pair of said opposite edges at the second region of said second part;

making upper and lower stops, configured to substantially the size and shape of the second part of said hinge frame, at least a first surface of each said stop having first and second juxtaposed regions substantially identical to said first and second regions of said hinge frame;

placing and temporarily attaching said lower stop onto a bench;

positioning said hinge frame over said lower stop with at least the said pair of opposite outer edges of said second regions of the facing surfaces of said hinge frame and said lower stop being substantially aligned;

clamping a portion of said first strut to said table to tilt said hinge frame relative to said lower stop about a tilt line adjacent and substantially parallel to said first edges to which said strut is attached;

attaching together said lower stop and said second part of said hinge frame, in said second regions, near said tilt line to hold said two members in their relative tilted position to create a gap between the first regions of said hinge frame and lower stop;

releasing said attached hinge frame and lower stop from said bench;

placing and attaching said upper stop onto said bench;

positioning said hinge frame and lower stop over said upper stop with said hinge frame adjacent said upper stop and at least the outer edges of said second regions of the facing surfaces of said upper stop and of said second part of said hinge frame being substantially aligned, said edges being substantially perpendicular to said hinge line;

clamping a portion of the outer end of said first strut to said table to tilt said hinge frame and lower stop relative to said upper stop about a tilt line adjacent and substantially parallel to said outer edges of said hinge frame and said upper stop;

attaching together said upper stop and said hinge frame near said last-named tilt line to hold said upper stop and hinge frame in their relative tilted position.

52. The method of claim 51 in which at least said stops and said second part of said hinge frame are substantially rectangular, and the common boundaries of said regions of each said surface extend from one of its short sides to the other.

53. The method of claim 52 in which said bench surface is substantially flat, said clamped struts have substantially planar surfaced pads on their outer ends, and said clamping is between said pads and said bench.

54. The method of claim 52 and further comprising the steps of removing said struts from said hinge frames and said stops after such spacers are no longer needed for tilting said hinge frames and stops.

55. The method of claim 52 in which said attaching is welding.

56. A product made by the method of claim 5.
57. A product made by the method of claim 6.
58. A product made by the method of claim 7.
59. A product made by the method of claim 8.
60. A product made by the method of claim 9.
61. A product made by the method of claim 10.
62. A product made by the method of claim 11.
63. A product made by the method of claim 12.
64. A product made by the method of claim 13.
65. A product made by the method of claim 14.
66. A product made by the method of claim 15.
67. A product made by the method of claim 16.
68. A product made by the method of claim 17.
69. A product made by the method of claim 18.
70. A product made by the method of claim 19.
71. A product made by the method of claim 20.
72. A product made by the method of claim 21.
73. A product made by the method of claim 22.
74. A product made by the method of claim 23.
75. A product made by the method of claim 24.
76. A product made by the method of claim 25.
77. A product made by the method of claim 26.
78. A product made by the method of claim 27.
79. A product made by the method of claim 28.
80. A product made by the method of claim 29.
81. A product made by the method of claim 30.
82. A product made by the method of claim 31.
83. A product made by the method of claim 32.
84. A product made by the method of claim 33.
85. A product made by the method of claim 34.
86. A product made by the method of claim 35.
87. A product made by the method of claim 36.
88. A product made by the method of claim 37.
89. A product made by the method of claim 38.
90. A product made by the method of claim 39.
91. A product made by the method of claim 40.
92. A product made by the method of claim 41.
93. A product made by the method of claim 42.
94. A product made by the method of claim 43.
95. A product made by the method of claim 44.
96. A product made by the method of claim 45.
97. A product made by the method of claim 46.
98. A product made by the method of claim 47.
99. A product made by the method of claim 48.
100. A product made by the method of claim 49.
101. A product made by the method of claim 50.
102. A product made by the method of claim 51.
103. A product made by the method of claim 52.
104. A product made by the method of claim 53.
105. A product made by the method of claim 54.
106. A product made by the method of claim 55.

* * * * *